(12) United States Patent
Ladd et al.

(10) Patent No.: US 12,033,228 B2
(45) Date of Patent: Jul. 9, 2024

(54) SYSTEM AND METHOD FOR ESTIMATING HVAC LOADS

(71) Applicant: Carrier Corporation, Palm Beach Gardens, FL (US)

(72) Inventors: Mark J. Ladd, Palm Beach Gardens, FL (US); Daniel J. Dempsey, Palm Beach Gardens, FL (US); Chetan Prabhu, Palm Beach Gardens, FL (US)

(73) Assignee: Carrier Corporation, Palm Beach Gardens, FL (US)

(*) Notice: Subject to any disclaimer, the term of this patent is extended or adjusted under 35 U.S.C. 154(b) by 356 days.

(21) Appl. No.: 17/251,400

(22) PCT Filed: Dec. 12, 2019

(86) PCT No.: PCT/US2019/065842
§ 371 (c)(1),
(2) Date: Dec. 11, 2020

(87) PCT Pub. No.: WO2020/123735
PCT Pub. Date: Jun. 18, 2020

(65) Prior Publication Data
US 2021/0256639 A1   Aug. 19, 2021

Related U.S. Application Data

(60) Provisional application No. 62/778,544, filed on Dec. 12, 2018.

(51) Int. Cl.
G06Q 50/163    (2024.01)
F24F 11/49     (2018.01)
F24F 11/63     (2018.01)
G06F 16/901    (2019.01)

(52) U.S. Cl.
CPC ............ *G06Q 50/163* (2013.01); *F24F 11/49* (2018.01); *F24F 11/63* (2018.01); *G06F 16/901* (2019.01)

(58) Field of Classification Search
None
See application file for complete search history.

(56) References Cited

U.S. PATENT DOCUMENTS

| 4,551,810 A | 11/1985 | Levine |
| 4,885,694 A | 12/1989 | Pray et al. |
| 5,227,983 A | 7/1993 | Cox et al. |

(Continued)

OTHER PUBLICATIONS

"Strategy Guideline: Accurate Heating and Cooling Load Calculations" (2011, US Dept. Energy) (Year: 2011).*

(Continued)

*Primary Examiner* — Dennis W Ruhl
(74) *Attorney, Agent, or Firm* — Carlson, Gaskey & Olds, P.C.

(57) ABSTRACT

A system for providing heating ventilation and cooling (HVAC) services includes a central server having an HVAC load estimation module. The central server is communicatively coupled to at least one database and includes instructions configured to cause the central server to receive a residence identifier from a user portal, retrieve a plurality of parameters correlated to the residence identifier from the at least one database, and estimate an HVAC load of a residence corresponding to the residence identifier based on the plurality of parameters.

24 Claims, 3 Drawing Sheets

(56) References Cited

U.S. PATENT DOCUMENTS

| | | | |
|---|---|---|---|
| 6,775,661 B1* | 8/2004 | Redner | G06F 16/25 |
| | | | 707/782 |
| 6,859,768 B1 | 2/2005 | Wakelam et al. | |
| 7,072,727 B1* | 7/2006 | Davis | F24F 11/46 |
| | | | 700/209 |
| 7,209,870 B2 | 4/2007 | Simmons et al. | |
| 7,689,386 B1 | 3/2010 | Gates | |
| 7,917,340 B2 | 3/2011 | Massaro et al. | |
| 8,000,832 B1 | 8/2011 | Schmidtke et al. | |
| 8,121,820 B2 | 2/2012 | Walch | |
| 8,145,578 B2 | 3/2012 | Pershing et al. | |
| 9,064,219 B2 | 6/2015 | Hall et al. | |
| 9,507,885 B2 | 11/2016 | Yu et al. | |
| 9,841,206 B2 | 12/2017 | Park et al. | |
| 2002/0002511 A1* | 1/2002 | Yim | G06Q 30/0625 |
| | | | 705/26.62 |
| 2008/0082183 A1* | 4/2008 | Judge | G05B 15/02 |
| | | | 700/32 |
| 2009/0271154 A1 | 10/2009 | Coad et al. | |
| 2011/0153524 A1 | 6/2011 | Schnackel | |
| 2011/0218777 A1 | 9/2011 | Chen et al. | |
| 2012/0072181 A1 | 3/2012 | Imani | |
| 2012/0078685 A1 | 3/2012 | Krebs et al. | |
| 2013/0144746 A1* | 6/2013 | Phung | G06Q 30/0611 |
| | | | 705/26.4 |
| 2013/0179373 A1 | 7/2013 | Mutchnik et al. | |
| 2013/0275174 A1 | 10/2013 | Bennett et al. | |
| 2014/0278280 A1 | 9/2014 | Pardo-Fernandez | |
| 2014/0278681 A1* | 9/2014 | Cox | G06Q 10/1095 |
| | | | 705/26.61 |
| 2015/0276251 A1 | 10/2015 | Smullin et al. | |
| 2017/0046766 A1* | 2/2017 | Rolles | G06Q 30/0627 |
| 2017/0236229 A1* | 8/2017 | Roof | G06Q 50/26 |
| | | | 705/345 |
| 2018/0218423 A1* | 8/2018 | Bryan | G06F 16/9535 |

OTHER PUBLICATIONS

"Air Conditioning Maintenance Costs" (Jun. 2018) (Year: 2018).*
"Manual J Calculation vs. Rule of Thumb"; Allison Bailes III, Phd (Year: 2016).*
"Worksheet for Manual J" (Year: 1996).*
"The NEWS" Cool Calc Manual J (Year: 2015).*
International Preliminary Report on Patentability for Application No. PCT/US2019/065842 dated Jun. 8, 2021.
Can you do a Manual J HVAC calculation in less than 60 seconds? Retrieved from https://www.proudgreenhome.com/news/can-you-do-a-manual-j-hvac-calculation-in-less-than-60-seconds/.
What's New in Cool Calc 2.0? Retrieved from https://www.coolcalc.com/.
International Search Report and Written Opinion for International Patent Application No. PCT/US2019/065842 dated Feb. 26, 2020.
Sandberg, Jonas, Chalmers, Computer Based Tools in the HVAC Design Process, Department of Energy and Environment Building Services Engineering, Chalmers University of Technology, Goteberg, Sweden 2001, p. 1-88.
Trane Switches Engines with TRACE 3D Plus, Office of Energy Efficiency & Renewable Energy, Sep. 27, 2017.
Carrier eDesign Suite.

* cited by examiner

SYSTEM AND METHOD FOR ESTIMATING HVAC LOADS

CROSS-REFERENCE TO RELATED APPLICATIONS

This application claims priority to U.S. Provisional Application No. 62/778,544, which was filed on Dec. 12, 2018 and is incorporated herein by reference.

TECHNICAL FIELD

The present disclosure relates generally to a system and method for estimating HVAC (heating, ventilation, and cooling) loads, and more specifically toward an automated system for estimating the loads.

BACKGROUND

Current HVAC suppliers for residential buildings operate through regional, or local dealers, each of whom has their own independent practices and procedures for determining the required HVAC load, and the appropriate equipment for meeting that load. Prior to selling and installing heating and cooling systems the building load must be estimated so that the proper size equipment can be specified. For accurate load estimates current load estimation methods require a technician to gather large amounts of data about the home structure from multiple disparate sources, including home inspections in some examples. This procedure is time consuming, and can result in substantial costs.

SUMMARY OF THE INVENTION

In one exemplary embodiment a system for providing heating ventilation and cooling (HVAC) services includes a central server including an HVAC load estimation module, the central server being communicatively coupled to at least one database, and wherein the central server includes instructions configured to cause the central server to receive a residence identifier from a user portal, retrieve a plurality of parameters correlated to the residence identifier from the at least one database, and estimate an HVAC load of a residence corresponding to the residence identifier based on the plurality of parameters.

In another example of the above described system for providing heating and ventilation and cooling (HVAC) services the at least one database includes a plurality of databases.

In another example of any of the above described systems for providing heating and ventilation and cooling (HVAC) services the central server includes a preference list, wherein the preference list is an ordered list of databases with an order of the ordered list being based on an accuracy of data contained within the database.

In another example of any of the above described systems for providing heating and ventilation and cooling (HVAC) services the ordered list includes a single order correlated by database.

In another example of any of the above described systems for providing heating and ventilation and cooling (HVAC) services the ordered list includes a plurality of orders, and wherein each of the orders is distinct from each other of the orders, and wherein each of the orders corresponds to at least one data point entry within the plurality of databases.

In another example of any of the above described systems for providing heating and ventilation and cooling (HVAC) services an estimated HVAC load is determined via $K3*$[FireplaceCount]$+K4*$[Climate Variable]$+K1*$[YearBuilt]$+K5*$[AdjustedLivingArea]$+K\ 6$, wherein FireplaceCount is a total number of fireplaces in the residence, Climate Variable is a variable representative of a climate in which the residence is located, YearBuilt is a year in which the residence was constructed, AdjustedLivingArea is a derivative value representative of a living area of the residence and K1, K3, K4, K5 and K6 are constants.

In another example of any of the above described systems for providing heating and ventilation and cooling (HVAC) services an estimated HVAC load is determined via $K3*$[FireplaceCount]$+K4*$[Climate Variable]$+K2*$[YearBuilt]$+K5*$[AdjustedLivingArea]$+K\ 7$, wherein FireplaceCount is a total number of fireplaces in the residence, Climate Variable is a variable representative of a climate in which the residence is located, YearBuilt is a year in which the residence was constructed, AdjustedLivingArea is a derivative value representative of a living area of the residence and K2, K3, K4, K5 and K7 are constants.

In another example of any of the above described systems for providing heating and ventilation and cooling (HVAC) services the AdjustedLivingArea is based at least in part on a Gross Area, a Living Area, a Garage Area, and a Basement Area parameter received from the at least one database.

In another example of any of the above described systems for providing heating and ventilation and cooling (HVAC) services the AdjustedLivingArea is determined via one of [LivingArea] and ([GrossArea]−[Garage Area]−[BasementArea]/2), where LivingArea is a total living area of the residence, GarageArea is a total garage area of the residence, BasementArea is a total basement area of the residence, and GrossArea is a total area of the residence.

An exemplary method for estimating a heating ventilation and cooling (HVAC) load includes receiving a unique residence identifier from a user, retrieving data correlated with the unique residence identifier from at least one database, and determining an estimated HVAC load based on the retrieved data by applying a unique weighting constant to each parameter, and summing the resultant values.

In another example of the above described method for estimating a heating ventilation and cooling load the at least one database comprises a plurality of databases.

In another example of any of the above described methods for estimating a heating ventilation and cooling load each of the databases in the plurality of databases includes at least one overlapping parameter, and wherein a central server includes a preference list configured to determine a preferred database in the plurality of databases in response to conflicting entries.

In another example of any of the above described methods for estimating a heating ventilation and cooling load the preference list is a single order correlated by database.

In another example of any of the above described methods for estimating a heating ventilation and cooling load the preference list includes a plurality of orders, wherein each of the orders is distinct from each other of the orders, and wherein each of the orders corresponds to at least one data point entry within the plurality of databases.

In another example of any of the above described methods for estimating a heating ventilation and cooling load applying the unique weighting constant to each parameter, and summing the resultant values comprises $K3*$[FireplaceCount]$+K4*$[Climate Variable]$+K1*$[YearBuilt]$+K5*$[AdjustedLivingArea]$+K\ 6$, wherein FireplaceCount is a total number of fireplaces in the residence, Climate Variable is a variable representative of a climate in which the residence is located, YearBuilt is a year in which the residence was constructed, AdjustedLivingArea is a derivative value representative of a living area of the residence and K1, K3, K4, K5 and K6 are constants.

In another example of any of the above described methods for estimating a heating ventilation and cooling load applying the unique weighting constant to each parameter, and summing the resultant values comprises K3*[FireplaceCount]+K4*[Climate Variable]+K2*[YearBuilt]+K5*[AdjustedLivingArea]+K 7, wherein FireplaceCount is a total number of fireplaces in the residence, Climate Variable is a variable representative of a climate in which the residence is located, YearBuilt is a year in which the residence was constructed, AdjustedLivingArea is a derivative value representative of a living area of the residence and K2, K3, K4, K5 and K7 are constants.

In another example of any of the above described methods for estimating a heating ventilation and cooling load the AdjustedLivingArea is based at least in part on a Gross Area, a Living Area, a Garage Area, and a Basement Area parameter received from the at least one database.

In another example of any of the above described methods for estimating a heating ventilation and cooling load the AdjustedLivingArea is determined via is determined via one of [LivingArea] and ([GrossArea]−[GarageArea]−[BasementArea]/2), where LivingArea is a total living area of the residence, GarageArea is a total garage area of the residence, BasementArea is a total basement area of the residence, and GrossArea is a total area of the residence.

Another example of any of the above described methods for estimating a heating ventilation and cooling load further includes determining an estimated cost for installation and maintenance of HVAC equipment based on the estimated HVAC load.

Another example of any of the above described methods for estimating a heating ventilation and cooling load further includes prompting a user to verify the retrieved data and allowing the user to correct inaccuracies in the retrieved data.

These and other features of the present invention can be best understood from the following specification and drawings, the following of which is a brief description.

DETAILED DESCRIPTION

Figure 1:
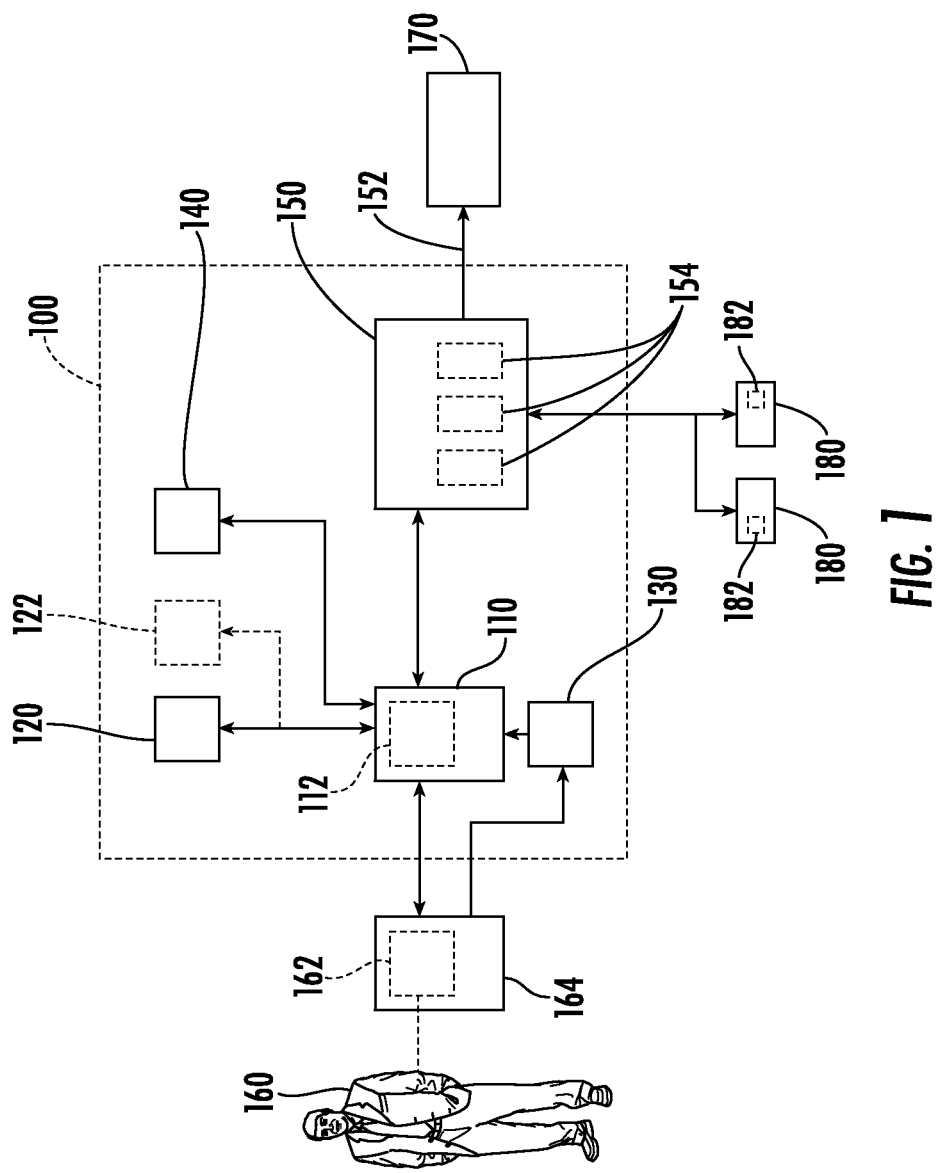
FIG. 1 schematically illustrates a system for providing HVAC services.

FIG. 1 schematically illustrates a system 100 for providing HVAC services. The system 100 is a computerized system including a central server 110 operating an HVAC load estimation module 112. The central server 110 is communicatively coupled to one or more residential information databases 120, 122, each of which contains details about residential buildings. By way of example, the databases 120, 122 can include details such as geographic location, number of stories, second floor area, third floor area, above grade area, addition area, attic main area, whether the basement is finished, basement type, number of bedrooms, condition of the building, construction type of the building, type of exterior wall, area of finished basement, type of fireplace, type of flooring, foundation specifications, area of the ground floor, roof specifications, building style, total building area, total adjusted living area, total number of rooms, upper building area, and effective year built etc. The central server 110 is also communicatively coupled to a payment processing service 130, a credit system 140, and an installation and maintenance scheduling system 150.

The HVAC load estimation module 112 can be accessed by a user 160 through a website 162 operating on a computing device 164. In alternative examples, the website 162 may be replaced with an application, a program, or any similar computerized module allowing the user 160 to interface with the central server 110 and initiate acquisition of HVAC services.

The HVAC load estimation module 112 is also connected to the installation and maintenance scheduling system 150, and automatically engages licensed contractors to perform HVAC installation and monitoring services once they have been determined by the HVAC load estimation module 112. The installation and maintenance scheduling system 150 provides an output 152 to independent contractor systems 170 to order physical installation and maintenance of the HVAC systems.

In some examples, the installation and maintenance scheduling system 150 can include HVAC systems monitoring modules 154. The HVAC systems monitoring modules 154 receive data from remote HVAC systems 180 that have been installed in a residential building. By way of examples, each of the HVAC systems 180 can include a remote monitoring module 182 as either hardware or software, and the remote monitoring module 182 can provide diagnostic and operational data of the HVAC system 180 to the HVAC systems monitoring modules 154.

The HVAC systems monitoring modules 154 can then determine any number of malfunctions, maintenance needs, routine adjustments and the like based on the actual received diagnostic data. Once a need has been determined, the corresponding HVAC system monitoring module 154 can either provide an automatic adjustment, when control settings need to be tweaked, or schedule a contractor visit when physical maintenance is required.

During practical operation of the system 100 for providing HVAC services, all of the operations and features within the system 100 are invisible to the end user 160, allowing for a simplified and easier to understand procedure for acquiring HVAC services.

Upon initial interaction with the central server 110, through the website 162, the user 160 provides the central server 110 with a unique residence identifier, such as a street address, of the residence that the user 160 wishes to determine the HVAC load for. Once the unique residence identifier has been received at the central server 110, the central server connects with the database(s) 120, 122 and retrieves all information related to the identified residence that is stored in each of the databases 120, 122.

In some examples, the databases 120, 122 from which this data is retrieved can include conflicting data where a single data point includes different entries in the different databases. When such a conflict occurs, the central server 110 can consult an internally stored preference list which identifies what database to give priority in the case of a conflict. In some examples, the preference list can be a simple ordered list of databases, with the highest listed database always having priority. In alternative examples, the preference list can include a distinct order for each data point, allowing databases 120, 122 that may be more accurate on one data point, but less accurate on another, to be correctly preferred for each data point.

The retrieved data is used to generate an expected HVAC load, which is then used to determine what HVAC equipment should be installed, or for any other determination in which the estimated HVAC load is a prerequisite.

Figure 2:
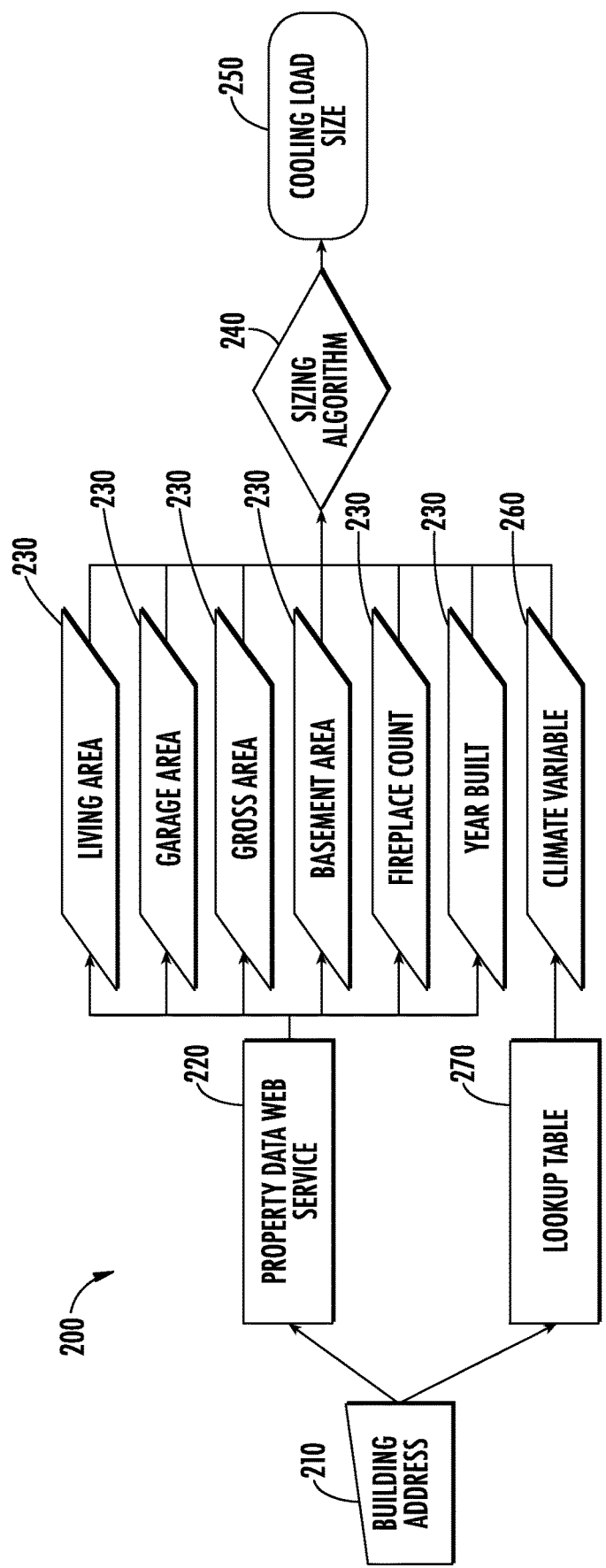
FIG. 2 illustrates a flowchart demonstrating an exemplary process for estimating an HVAC load.

With continued reference to FIG. 1, FIG. 2 schematically illustrates an exemplary operation 200 for determining the HVAC load estimate. Initially, as described above, the central server 110 provides the unique residence identifier 210 (e.g. the building address) to the one or more databases 120, 122 through a Property Data service 220. The property data service 220 can be one or more public, or semi-public services which maintain databases and allow access to the databases. Once the databases 120, 122 have been accessed, the central server 110 identifies multiple relevant data points 230 corresponding to features and parameters of the residence.

The identified data points are provided to a predefined algorithm 240 that correlates and weights the data points to determine an estimated cooling load 250. While six exemplary data points 230 are listed in the example of FIG. 2, on of skill in the art will appreciate that any number of additional examples, including those described below, as well as other data points 230, could be utilized instead of, or in addition to, the listed data points 230. Further, one of skill in the art will appreciate that the specifically listed exemplary data points may be utilized to determine, or partially determine, derived parameters. Derived parameters are parameters that do not have a direct listing in the database(s) 120, 122, but are determined based on a combination of multiple parameters included within the database(s) 120, 122.

In some examples, an additional climate variable 260 can be assigned based on a geographic location of the residence identifier 210. In such examples, the climate variable 260 is stored in a lookup table 270 within the central server 110, or in a database connected to the central server 110. The climate variable is a numeric variable that reflects the expected maximum temperature, expected minimum temperature, and expected variation of the weather, based on a geographic location of the residence (e.g. a zip code in which the residence is located), and the lookup table can include any number of climate variables applied via a geographic reference. By way of example, the climate variable can be based on zip codes, global positioning system (GPS) coordinates, latitude and longitude, or any similar metric.

Figure 3:
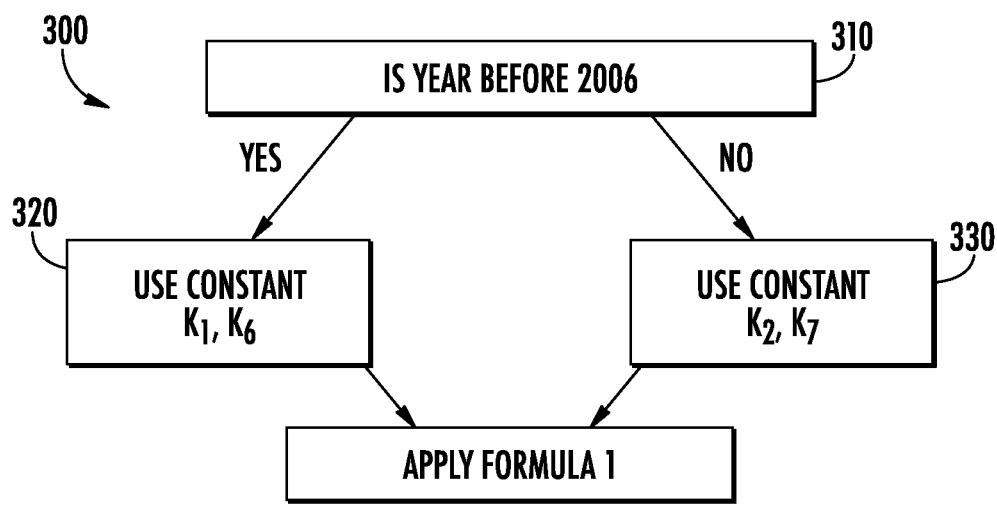
FIG. 3 illustrates an algorithm for estimating the HVAC load of FIG. 2.

With continued reference to FIG. 2, FIG. 3 illustrates an exemplary sizing algorithm 300 generating a cooling load estimate using the following exemplary formulas.

$K3*[FireplaceCount]+K4*[Climate\ Variable]+[K1\ or\ K2]*[YearBuilt]+K5*[AdjustedLivingArea]+[K6\ or\ K7].$   Formula 1:

$[LivingArea]\ or\ ([GrossArea]-[GarageArea]-[BasementArea]/2).$   Formula 2:

The sizing algorithm 300, utilizes constants to weight each parameter, and applies the parameters within a formula (Formula 1) to determine an estimated cooling load in BTUh (British Thermal Units per hour). It is appreciated that alternative constants could be utilized to determine the estimated cooling load in alternative units, and the alternative constants can be established by one of skill in the art based on the specific units being utilized.

Initially the algorithm 300 determines if the year the residence was built is prior to 2006 in an "Is Year Before 2006" step 310. If the year the residence was built is before 2006, the algorithm applies constant K1 to the year built parameter, and adds constant K6 within Formula 1 in a "Use Constants K1, K6" step 320. If the residence was built in or after 2006, a second constant K2 is applied to the year built parameter, and constant K7 is applied within Formula 1 in a "Use Constants K2, K7" step 330. It will be appreciated that the year 2006 is an exemplary embodiment; however, any other year may be used in the calculation.

The specific values for the constants can be determined by one of skill in the art, depending on the specific factors being considered. In one example of Formula 1, the values can be K1=−19.9335, K2=−504.982, K3=5753, K4=2.5924, K5=1.2194, K6=53953.34, and K7=1025777.91. Each of the constants is sized to scale the corresponding parameter into the correct magnitude to produce a cooling load value measured in BTUh.

Once the specific constants have been determined, Formula 1 is applied using the data points retrieved from the databases to fill in each parameter. With regards to the "AdjustedLivingArea" parameter, the parameter is a derived value. In the exemplary algorithm, the AdjustedLivingArea parameter is derived from the Gross Area, the Living Area, the Garage Area, and the Basement Area parameters, as shown in Formula 2. In alternative examples, the AdjustedLivingArea parameter can be further derived from additional parameters such as number of floors, second floor living area, third floor living area, etc.

In some examples, such as those where information is omitted from the databases 120, 122 or those where the information contained in the databases 120, 122 is inaccurate, the user or a technician can be prompted to update the corresponding data points. When such an update is provided, the algorithm 300 is reiterated, thereby providing a new cooling load estimate. The reiteration can be performed immediately, such as when the user 160 updates information, or can be performed after an on-site inspection where a technician identifies a discrepancy between the reality of the residence and the information included in the database.

In the example implementation, once the load has been determined via Formula 1, the HVAC load estimation module 112 uses the load to determine what HVAC devices and what HVAC services are required for the residence in order to meet the load. The HVAC load estimation module 112 can further determine, based on the environment, the specific load, and the specific equipment selected to fulfill the load how often routine maintenance should occur. By way of example, the routine maintenance can include filter changing, heater tuning, air condition tuning, and the like.

When the HVAC load estimation module 112 has determined the type and frequencies of the routine maintenance, as well as the specific HVAC equipment to be installed, the HVAC load estimation module 112, or another module within the central server 110 determines an estimated recurring cost sufficient to cover the installation and maintenance over a predetermined time frame. By way of example, the time frame can be 10 years, with the recurring price being paid monthly, quarterly, or yearly.

By utilizing the above system and methods, the customer (user 160) is presented with a substantially simplified set of decisions, and with the results of calculations that typically take a professional to complete. This allows the user 160 to more easily understand the offerings and costs associated with the requested HVAC system, as well as the expected continued upkeep costs of the system.

While described above within the context of a system 100 for estimating installation and services cost for an HVAC system, it is appreciated that the estimation described here can be utilized in conjunction with any system where an HVAC load is desirable, and is not limited in application to the example system 100.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A system for providing heating ventilation and cooling (HVAC) services comprising:
a central server including an HVAC load estimation module, the central server being communicatively coupled to a plurality of databases;
at least one input portal receiving data input and comprising an interface with the central server to initiate acquisition of HVAC services;
a plurality of HVAC systems configured to provide the HVAC services;
wherein the central server includes instructions configured to cause the central server to
receive a residence identifier from the at least one input portal,
retrieve a plurality of parameters correlated to the residence identifier from the plurality of databases, wherein the central server automatically compares common data points within the plurality of databases to identify conflicting data and identifies data that is omitted from the plurality of databases,
in accordance with a determination that conflicting data is identified, the central server automatically prioritizes the plurality of databases to determine which database of the plurality of databases to give priority to for each conflicting data point,
in accordance with a determination that omitted data is identified, the central server generates an update prompt to a user or a technician to request that omitted data be supplied to the central server via an input portal,
estimate an HVAC load of a residence corresponding to the residence identifier based on the plurality of parameters and any updated data, and
identifying at least one HVAC system of the plurality of HVAC systems that meets an estimated HVAC load of a residence corresponding to the residence identifier; and
wherein the HVAC load estimation module is in communication with an installation and maintenance scheduling system that includes at least one HVAC system monitoring module that receives data from an HVAC system that is at a remote location;
wherein the HVAC system includes at least one remote monitoring module that communicates diagnostic and operational data of the HVAC system to the at least one HVAC system monitoring module, and wherein the at least one HVAC system monitoring module determines any HVAC system needs based on communicated diagnostic and operational data; and
in accordance with an identification of an HVAC system need based on received diagnostic and operational data, the central server automatically generates a communication signal to adjust control settings for the HVAC system at the remote location.

2. The system of claim 1, wherein the central server includes an internally stored preference list, wherein the internally stored preference list comprises an ordered list of databases wherein a highest listed database always has priority over lower listed databases, or wherein the internally stored preference list has a distinct order for each data point such that the central server determines which database to give priority to for each conflicting data point such that each conflicting data point is resolved on a case by case basis.

3. The system of claim 1, wherein the HVAC load estimated by the central server is determined via: K3*[FireplaceCount]+K4*[Climate Variable]+K1*[YearBuilt]+K5*[AdjustedLivingArea]+K6, wherein FireplaceCount is a total number of fireplaces in the residence, Climate Variable is a variable representative of a climate in which the residence is located, YearBuilt is a year in which the residence was constructed, AdjustedLivingArea is a derivative value representative of a living area of the residence and K1, K3, K4, K5 and K6 are constants, and wherein K1 and K6 are used when the residence is built prior to the YearBuilt.

4. The system of claim 1, wherein the HVAC load estimated by the central server is determined via: K3*[FireplaceCount]+K4*[Climate Variable]+K2*[YearBuilt]+K5*[AdjustedLivingArea]+K7, wherein FireplaceCount is a total number of fireplaces in the residence, Climate Variable is a variable representative of a climate in which the residence is located, YearBuilt is a year in which the residence was constructed, AdjustedLivingArea is a derivative value representative of a living area of the residence and K2, K3, K4, K5 and K7 are constants, and wherein K2 and K7 are used when the residence is built in or after the YearBuilt.

5. The system of claim 4, wherein the AdjustedLivingArea is based at least in part on a Gross Area, a Living Area, a Garage Area, and a Basement Area parameter received from at least one database.

6. The system of claim 5, wherein the AdjustedLivingArea is determined via one of [LivingArea] and ([GrossArea]−[GarageArea]−[BasementArea]/2), where LivingArea is a total living area of the residence, GarageArea is a total garage area of the residence, BasementArea is a total basement area of the residence, and GrossArea is a total area of the residence.

7. The system of claim 1, wherein the HVAC load estimation module is in communication with an installation and maintenance scheduling system, and in accordance with a determination of an estimated HVAC load, automatically generating an output to order installation of an HVAC system that can provide the estimated HVAC load.

8. The system of claim 7, wherein maintenance data is communicated to the installation and maintenance scheduling system, and wherein an output is generated to order maintenance of the HVAC system when a maintenance issue is identified.

9. The system of claim 1, wherein the at least one remote monitoring module receives operational data from the HVAC system and communicates diagnostic and operational data of the HVAC system to the at least one HVAC system monitoring module, and wherein the at least one HVAC system monitoring module determines any HVAC system needs based on communicated diagnostic and operational data.

10. The system of claim 9, wherein, once the HVAC system need has been identified, determining whether an automatic adjustment of the control settings meets the HVAC system need, and scheduling a contractor visit when automatic adjustment does not meet the HVAC system need and physical maintenance is required.

11. The system of claim 1, wherein the central server immediately generates an updated HVAC load estimate each time updated data is received by the central server in response to the update prompt.

12. A method for estimating a heating ventilation and cooling (HVAC) load using a system for providing heating ventilation and cooling (HVAC) services that includes a central server with an HVAC load estimation module, the method comprising:
providing an input portal to receive data input and comprising an interface with the central server;
providing a plurality of HVAC systems configured to provide HVAC services;
initiating acquisition of HVAC services by communicating a residence identifier from a user to the central server using the input portal;
retrieving data correlated with the residence identifier from a plurality of databases, the central server automatically comparing common data points within the plurality of databases to identify conflicting data and identifying data that is omitted from the plurality of databases, and
in accordance with a determination that conflicting data is identified, automatically prioritizing the plurality of databases to determine which database to give priority to for each conflicting data point,
in accordance with a determination that omitted data is identified, generating an update prompt communicated to the user or a technician to request that omitted data be supplied to the central server via the input portal;
determining an estimated HVAC load based on retrieved data by applying a weighting constant to each parameter of a plurality of parameters, and summing resultant values, wherein the plurality of parameters are determined based on retrieved data and any updated data;
identifying at least one HVAC system of the plurality of HVAC systems that meets an estimated HVAC load of a residence corresponding to the residence identifier; and
wherein the HVAC load estimation module is in communication with an installation and maintenance scheduling system that includes at least one HVAC system monitoring module that receives data from an HVAC system that is at a remote location;
wherein the HVAC system includes at least one remote monitoring module that communicates diagnostic and operational data of the HVAC system to the at least one HVAC system monitoring module, and wherein the at least one HVAC system monitoring module determines any HVAC system needs based on communicated diagnostic and operational data; and
in accordance with an identification of an HVAC system need based on received diagnostic and operational data, the central server automatically generates a communication signal to adjust control settings for the HVAC system at the remote location.

13. The method of claim 12, wherein the central server includes an internally stored preference list that comprises an ordered list of databases, and wherein a highest listed database always has priority over lower listed databases, or wherein the internally stored preference list has a distinct order for each data point such that the central server determines which database to give priority to for each conflicting data point such that each conflicting data point is resolved on a case by case basis.

14. The method of claim 12, wherein applying the weighting constant to each parameter, and summing the resultant values to determine the estimated HVAC load comprises: $K3*[FireplaceCount]+K4*[Climate Variable]+K1*[YearBuilt]+K5*[AdjustedLivingArea]+K6$, wherein FireplaceCount is a total number of fireplaces in the residence, Climate Variable is a variable representative of a climate in which the residence is located, YearBuilt is a year in which the residence was constructed, AdjustedLivingArea is a derivative value representative of a living area of the residence and K1, K3, K4, K5 and K6 are constants, and wherein K1 and K6 are used when the residence is built prior to the YearBuilt.

15. The method of claim 12, wherein applying the weighting constant to each parameter, and summing the resultant values to determine the estimated HVAC load comprises: $K3*[FireplaceCount]+K4*[Climate Variable]+K2*[YearBuilt]+K5*[AdjustedLivingArea]+K7$, wherein FireplaceCount is a total number of fireplaces in the residence, Climate Variable is a variable representative of a climate in which the residence is located, YearBuilt is a year in which the residence was constructed, AdjustedLivingArea is a derivative value representative of a living area of the residence and K2, K3, K4, K5 and K7 are constants, and wherein K2 and K7 are used when the residence is built in or after the YearBuilt.

16. The method of claim 15, wherein the AdjustedLivingArea is based at least in part on a Gross Area, a Living Area, a Garage Area, and a Basement Area parameter received from at least one database.

17. The method of claim 16, wherein the AdjustedLivingArea is determined via one of [LivingArea] and ([GrossArea]−[GarageArea]−[BasementArea]/2), where LivingArea is a total living area of the residence, GarageArea is a total garage area of the residence, BasementArea is a total basement area of the residence, and GrossArea is a total area of the residence.

18. The method of claim 12, further comprising determining an estimated cost for installation and maintenance of HVAC equipment based on the estimated HVAC load.

19. The method of claim 12, further comprising prompting a user to verify the retrieved data and allowing the user to correct inaccuracies in the retrieved data.

20. The method of claim 12, including communicatively connecting the HVAC load estimation module with an installation and maintenance scheduling system and in accordance with a determination of the estimated HVAC load, automatically generating an output via the installation and maintenance scheduling system to order installation of the HVAC system that can provide the estimated HVAC load.

21. The method of claim 20, including communicating maintenance data to the installation and maintenance scheduling system and generating an output to order maintenance of the HVAC system when a maintenance issue is identified.

22. The method of claim 12, wherein the at least one remote monitoring module receives operational data from the HVAC system and communicates received diagnostic and operational data of the HVAC system to the at least one HVAC system monitoring module, and including determining any HVAC system needs via the at least one HVAC system monitoring module based on communicated diagnostic and operational data.

23. The method of claim 22, wherein, once the HVAC system need has been identified, determining whether an automatic adjustment of the control settings meets the HVAC system need, and automatically scheduling a contractor visit when automatic adjustment does not meet the HVAC system need and physical maintenance is required.

24. The method of claim 12, including immediately generating an updated HVAC load estimate each time updated data is received by the central server in response to the update prompt.

* * * * *